UNITED STATES PATENT OFFICE.

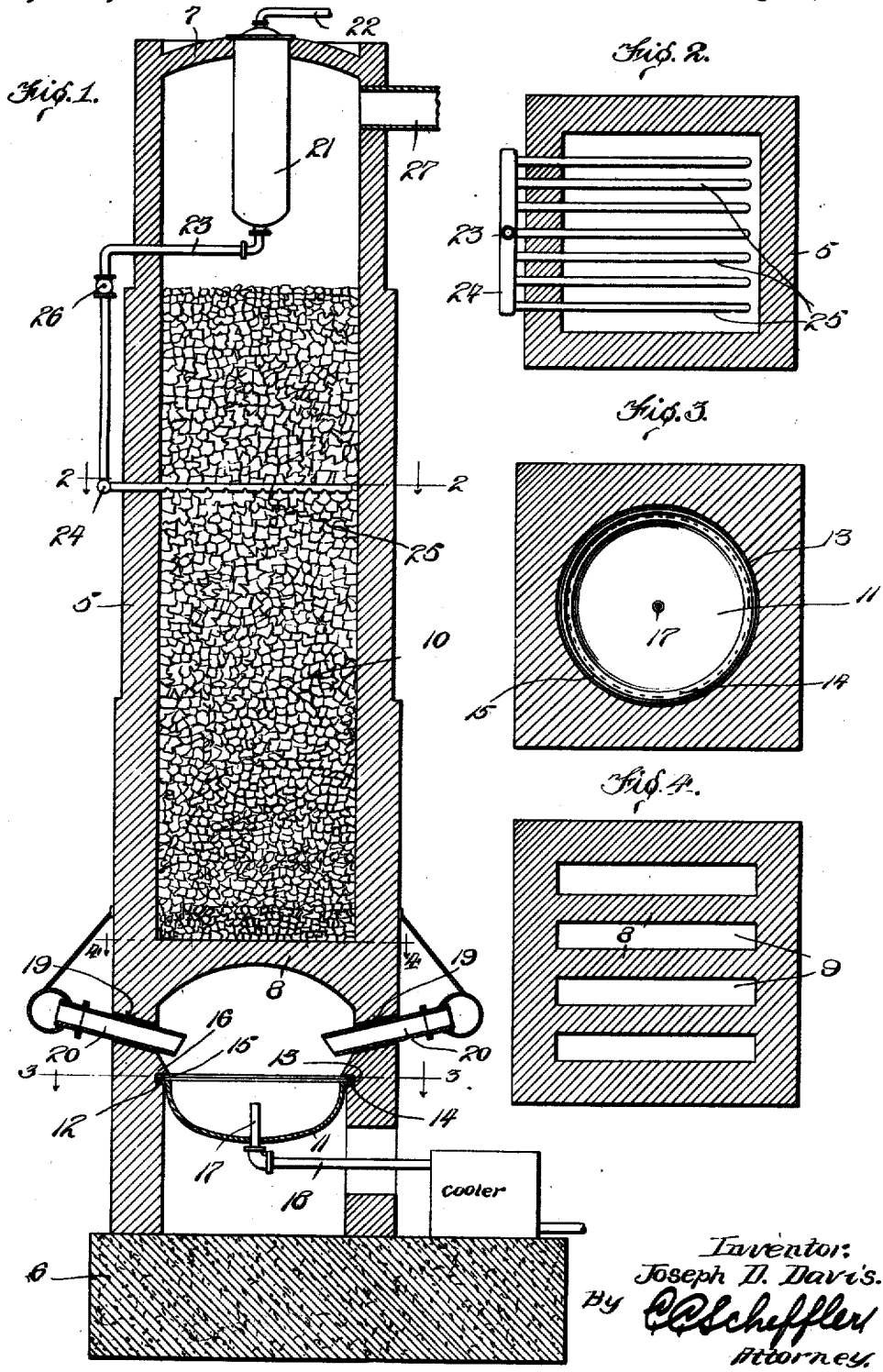
J. D. DAVIS.
PROCESS OF CONCENTRATING NITRIC ACID AND APPARATUS THEREFOR.
APPLICATION FILED AUG. 8, 1918.
1,314,485. Patented Aug. 26, 1919.
Inventor:
Joseph D. Davis.

JOSEPH D. DAVIS, OF WASHINGTON, DISTRICT OF COLUMBIA.

PROCESS OF CONCENTRATING NITRIC ACID AND APPARATUS THEREFOR.

1,314,485.  Specification of Letters Patent.  Patented Aug. 26, 1919.

Application filed August 8, 1918. Serial No. 248,880½.

(FILED UNDER THE ACT OF MARCH 3, 1883, 22 STAT. L., 625.)

*To all whom it may concern:*

Be it known that I, JOSEPH D. DAVIS, a citizen of the United States, and a resident of Washington, in the District of Columbia, and an employee of the United States Bureau of Mines at Washington, have invented certain new and useful Improvements in Processes of Concentrating Nitric Acid and Apparatus Therefor, of which the following is a specification.

This application is made under the act of March 3, 1883, chapter 143 (22 Stat., 625) and the invention herein described and claimed may be used by the Government of the United States or any of its officers or employees in the prosecution of work for the United States, or by any other person in the United States, without the payment of any royalty thereon.

My invention relates to improvements in the process of forming nitric acid from water, air and gas mixtures containing oxids of nitrogen and including certain novel apparatus adapted for use in said improved process.

In the known methods for the synthetic production of nitric acid, such as the arc process or the ammonia oxidation process, the initial stage of the operation produces a mixture containing the higher oxids of nitrogen with other diluting gases. It has been the custom to pass this mixture, usually after a supplementary oxidation, into absorbing apparatus, where it is brought into contact with water or dilute nitric acid, whereupon the water of the absorbent, the oxids of nitrogen and the oxygen mixed with the oxids form nitric acid.

To secure an approximately complete absorption of the oxids and consequent high efficiency in the process it is necessary that the absorbent liquid and the gases in contact therewith should be kept at as low a temperature as possible, the maximum permissible temperature being only a little above that ordinarily prevailing in the atmosphere. Since the mixtures of oxids of nitrogen produced in the above methods contain a large amount of sensible heat, the gases coming from an ammonia oxidizer being ordinarily around 650° C., it is essential that artificial cooling of the gases be resorted to.

The cooling of the gases is a very troublesome operation because of the fact that as soon as they are cooled to the point where the water-vapor begins to condense, liquid nitric acid is formed and this is highly corrosive to most common metals. Materials not affected by nitric acid and of sufficiently low price to permit their use for coolers are poor conductors of heat and difficult to join. For this reason, the coolers have been made of aluminum or better of acid resisting alloys like the silicon-iron alloy sold under the name of "duriron." It is obvious that economical operation requires that the heat absorbed from the gases should to applied to some useful purpose but the materials which can withstand the action of liquid nitric acid are so poorly adapted to the construction of heat-utilizing apparatus of the requisite size that air-coolers have usually been used, and a large amount of heat consequently totally lost.

A complete absorption of the oxids of nitrogen also requires that the concentration of the acid in the absorbing apparatus be kept down so that in the usual absorption apparatus it is not possible to obtain an acid of much over 50% $HNO_3$. A stronger acid being required for most purposes, this acid must be concentrated and this concentration requires heat.

The object of my invention is to provide a process by which the cooling apparatus heretofore used may be largely replaced by an apparatus of cheap and permanent construction and in which a large portion of the heat of the gases from the oxidizer may be usefully applied. These objects I attain by using a novel apparatus of which one form is shown in the accompanying drawings and by utilizing the hot gases to concentrate a portion of the dilute acid from the absorber, whereby the gases lose the greater part of their sensible heat.

In the accompanying drawings illustrating an embodiment of the apparatus of my invention, Figure 1 is a vertical section of the apparatus.

Fig. 2 is a section on line 2—2 of Fig. 1.

Fig. 3 is a section on line 3—3 of Fig. 1, and

Fig. 4 is a section on line 4—4 of Fig. 1.

A shaft of acid proof masonry having walls 5, is supported upon a base 6 and closed at its top by an arch 7. In the lower part of the shaft is a series of parallel arches 8 having between them a series of slots 9 through which communicate the portions of the shaft above and below the arches 8. The portion of the shaft above the arches is filled to a depth of several feet with broken quartz or other acid proof material 10 a considerable clear space being left in the shaft above the filling material.

Below the arches 8 is mounted a basin 11 of duriron or other material resistant to strong hot nitric acid. The basin is supported by means of a shoulder 12 forming the lower boundary of an annular groove 13 formed in the masonry of the shaft. The basin is provided with a flange 14 entering the groove 13 and resting on the shoulder 12 and the apron 16 and the extension of the flange 15 coact to cause the nitric acid flowing down through the shaft in the manner hereafter described to collect inside the basin 11.

The basin 11 is provided with an overflow 17 connected by a pipe 18 to an acid-proof cooler of any suitable construction.

In the walls of the shaft, below the arches 8 and above the basin 11, are provided openings 19 through which enter acid-proof twyers 20. These may be provided in any suitable number and are connected at their outer ends with the source of supply of the hot nitrous gases in any suitable manner.

In the upper end of the shaft above the packing material is the tank 21. This is fed by pipe 22 and discharges through pipe 23 into a manifold 24 to which are connected a series of perforated pipes 25 inserted in the filling material below its top. A portion of the pipe 23 lies outside the shaft so that the valve 26 in the pipe may be accessible. An exit pipe 27 is provided in the top of the shaft.

In using this apparatus to carry out my new process, I cause dilute nitric acid, which may be the cold dilute acid discharged from the absorbing apparatus, to enter the tank 21. Through the twyers 18, I introduce hot nitrous gases from an ammonia oxidizing chamber or other source. The hot gases rise through the filling material 10 and eventually pass out through the exit pipe 27. The dilute acid becomes heated in the tank 21, flows through pipe 23, manifold 24, and the perforated pipes 25 onto the filling material and then flows down in thin streams in contact with the rising hot gases until it passes through the slots 9 into the basin 11. Since the gases enter the apparatus at a temperature much above the boiling point of concentrated nitric acid, the descending acid boils and water is removed, so that it collects in the basin 11 in a concentrated state. The ascending gases are cooled and on leaving the apparatus carry with them the water volatilized in the shaft.

The nitrous gases escaping through exit pipe 27 are still too hot to enter the absorbers and a cooling system between the apparatus shown and the absorbers will be necessary. However the gases will have been cooled several hundred degrees so that they can be passed through the cooling system very much more rapidly than if they entered it at their maximum temperature. This permits a very much smaller and hence cheaper cooling system to be employed. It will be observed that the heat abstracted from the gases in the concentrator shown has performed the useful work of concentrating a large amount of nitric acid. The concentrator is of simple, cheap and permanent construction and since it absorbs heat by evaporation of liquid instead of dissipating it by radiation, an apparatus of comparatively small size has a high capacity for treating gases.

What I claim is:

1. The process of concentrating nitric acid which comprises causing it to flow in fine streams in contact with hot nitrous gases, said gases being initially at a temperature exceeding 300° C.

2. The process of concentrating nitric acid which comprises causing it to flow in fine streams in contact with a stream of hot nitrous gases, said gases being initially at a temperature exceeding 300° C., and said acid and gases flowing in countercurrent.

3. The process of concentrating dilute nitric acid which comprises causing it to flow downwardly through a shaft and passing hot nitrous gases upwardly through said shaft, said gases being introduced into said shaft at a temperature exceeding 300° C.

4. The process which comprises passing nitrous gases resulting from the oxidation of ammonia in contact with dilute nitric acid while said gases are at a temperature exceeding 300° C., whereby said gases are cooled and said acid is concentrated.

5. The process which comprises passing nitrous gases resulting from the oxidation of ammonia in counter-current to and in contact with dilute nitric acid, said gases being initially at a temperature exceeding 300° C., whereby said gases are cooled and said acid is concentrated.

6. An apparatus for concentrating nitric acid which comprises a shaft, an acid-proof filling material therefor, a preheating tank in the top of said shaft, means for leading dilute nitric acid into said tank, means for introducing hot nitrous gases into the bottom of said shaft, means for leading dilute nitric acid from said preheating tank onto said filling material at the upper portion thereof, and means for collecting nitric acid after its descent through said shaft.

7. An apparatus for concentrating nitric acid comprising a shaft, a filling of acid-proof material in said shaft, a preheating tank in the upper part of said shaft, a plurality of perforated pipes embedded in the upper portion of said filling material, a conduit leading from said preheating tank to said plurality of perforated pipes and a receptacle below said filling material for collecting the nitric acid descending through said filling material.

8. An apparatus for concentrating nitric acid which comprises a covered shaft, a filling of divided acid-proof material therefor, the top of which is spaced from said cover, a preheating tank in said shaft above said filling material, a conduit leading from said preheating tank to the upper part of said filling material, a permeable support under said filling material, means for introducing gases under said support, an exit for gases above said filling material, and an acid-proof basin below said gas-introducing means.

In testimony whereof I affix my signature.

JOSEPH D. DAVIS.

Copies of this patent may be obtained for five cents each, by addressing the "Commissioner of Patents, Washington, D. C."